April 22, 1941. P. R. DUNLAP 2,239,193
MEANS FOR TESTING ELECTRICAL APPARATUS
Filed Feb. 20, 1939
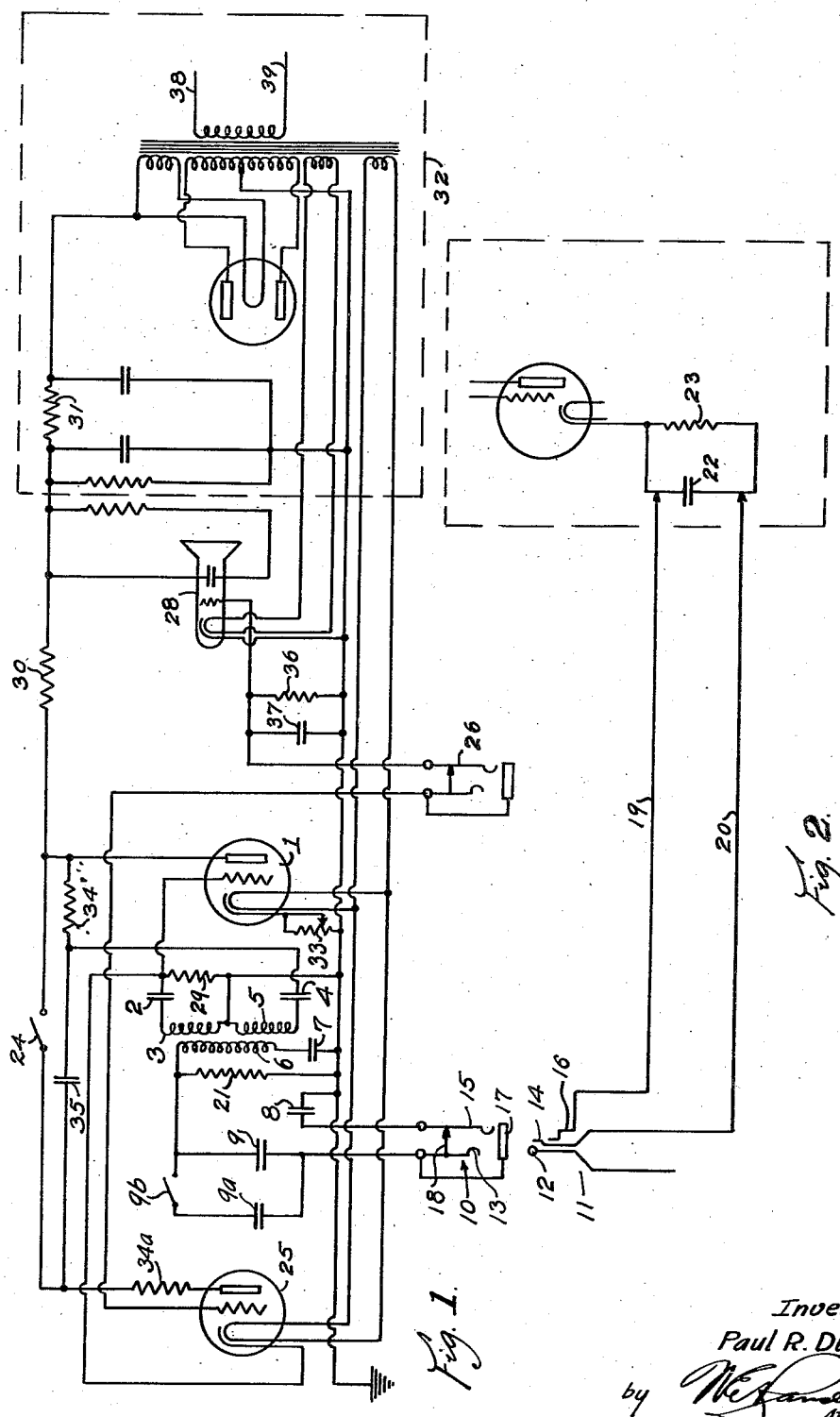
Inventor:
Paul R. Dunlap
by
Attorney.

Patented Apr. 22, 1941

2,239,193

UNITED STATES PATENT OFFICE 2,239,193

MEANS FOR TESTING ELECTRICAL APPARATUS

Paul R. Dunlap, Portland, Oreg.

Application February 20, 1939, Serial No. 257,358

13 Claims. (Cl. 175—183)

My invention relates to the testing of electrical apparatus; more particularly it relates to the testing of individual elements of said apparatus to determine which of said elements is at fault when said apparatus as a whole does not function properly. It is desirable to test said elements in place and without disconnecting other elements therefrom. The reason for this is not only to avoid unnecessary labor, but also because many parts of electrical apparatus, such as small by-pass condensers, are liable to be damaged by said disconnecting operation. However, test methods and means heretofore used have not usually permitted the testing of individual elements of electrical apparatus in place because said parts have commonly been connected in such intricate networks that they could not be distinguished, electrically, one from another. For example, a condenser and a resistor are commonly connected in parallel in the cathode circuits of vacuum tubes, and it has not heretofore been possible to test said condenser without first removing said resistor.

Failure of an individual element of electrical apparatus is, in general, due to either an increase or a decrease in the electrical impedance of said element. Decreased impedance seldom occurs except in cases of short-circuit, which may be detected by means heretofore known. Cases of increased impedance are more difficult to locate even when they constitute open circuits because, for one reason, there are usually parallel branch circuits that prevent the ordinary test equipment indicating high impedance, and for another reason, said high impedance or open circuit may be of an intermittent character. The electrical circuit element may function perfectly for hours or even days, and then it may fail at irregular intervals. Less commonly, intermittent failure may be due to a short-circuit in said element.

It has not been possible to hasten the occurrence of the intermittent failure of circuit elements, thereby more speedily to locate the trouble. Seemingly the repair man has only two alternatives. He may wait patiently for the trouble to recur, or he may replace all of the parts of the apparatus which, in his opinion, might possibly cause the trouble. The latter solution of the problem is frequently resorted to notwithstanding the expense involved in replacing a large number of parts uselessly. Also, it frequently happens that the repair man guesses wrong as to the location of the trouble and finds that after much time and money has been spent in replacing suspected parts, the trouble recurs as before. The former solution requires too much of the repair man's time waiting for the trouble to reappear.

The principal object of my invention is to provide means which, when connected to a condenser, coil, resistor, or other part of electrical apparatus, is adapted to register any momentary failure of said part occurring at any time said means and said part are connected. I attain said object, in some cases, by making said component part an essential part of a vacuum tube oscillator circuit, so that said oscillator will cease generating high frequency currents when said component part fails. I then provide means for registering the stopping of said oscillator, said registration persisting until re-set by an attendant. In this way a repair man may connect the apparatus, hereinafter described in detail, to a part which he suspects of causing trouble intermittently, and thereafter he may return and learn whether or not said part has failed at any time during his absence. In other cases such, for example, as when a resistor having a condenser connected in parallel therewith is to be tested for intermittent failure, I attain said object by making said resistor a part of a direct current circuit the momentary interruption of which is adapted to stop the aforesaid oscillator, thereby causing the fact of said interruption to be registered as described.

A further object of my invention is to provide means for testing electrical condensers to determine whether or not their impedance is abnormally high without disconnecting said condenser from the remainder of the circuit. Generally speaking, I attain said object by providing a source of electric current for testing said condenser at a frequency sufficiently high that said condenser offers an impedance thereto substantially lower than that of other elements, such as resistances and inductances, that may be connected in parallel therewith. An indication of said low impedance will then be an indication that said condenser is functioning properly whereas if the impedance of said condenser were abnormally high that fact would be indicated.

A further object of my invention is to provide means for registering intermittent failure of an electrical condenser without disconnecting the same from resistors, inductances, or other elements that may be connected in parallel therewith. I attain said object, in general, by making said condenser an essential part of a vacuum tube oscillator test circuit, said oscillator being adapted to generate electrical currents of frequency sufficiently high that the reactance of said condenser will normally be low compared to the impedance of said other elements that might be connected in parallel therewith.

A further object of my invention is to provide means which, when connected to a component part of electrical apparatus, is adapted to apply thereto a uni-directional voltage and thereby register any momentary failure of said part to pass direct current occurring at any time said means and said part are connected.

A further object of my invention is to provide means for testing the component parts of electrical apparatus, such as a radio receiver or telephone equipment, while said apparatus is in use.

Other objects and advantages of my invention will be described with reference to the accompanying drawing in which:

Fig. 1 is a schematic illustration of the electric circuit of test apparatus embodying my invention; and Fig. 2 is a schematic illustration of the electric circuit of a portion of a typical radio set, including a condenser to be tested, with the clip leads shown in Fig. 1 connected to said condenser.

A vacuum tube 1 having a grid circuit comprising condenser 2 and coil 3 and a plate circuit comprising condenser 4 and coil 5 is adapted to oscillate at a frequency determined largely by coil 6 and the condensers connected thereto to form an oscillating circuit, when said coils 3 and 5 are coupled to said coil 6, that is, when there is mutual inductance between said coils. This is a well known form of vacuum tube oscillator circuit sometimes called the Meissner circuit. I prefer to use a "76" type tube at 1. In ordinary operation condensers 7, 8, and 9 in series are connected across coil 6. In testing parts of radio receivers, I find it satisfactory to so adjust condensers 7, 8, and 9 and coils 3, 5, and 6 that currents of a frequency of about 5,700 kilocycles are generated by said oscillator. This frequency is not critical, and its proper value will be hereinafter discussed. The ratio of inductance to capacity of the aforesaid coils and condensers is rather important; said ratio may be varied to secure certain advantageous results under various circumstances, which variation will be hereinafter discussed. However, by way of example, it may be stated that satisfactory results will be obtained if condenser 7 be about 0.00025 microfarad capacity and condensers 8 and 9 be about 0.001 microfarad capacity each, and if coil 6 consist of about 75 turns of wire of a mean radius of about 0.5 inch and coils 3 and 5 consist of about 50 turns of wire of the same mean radius.

A switch 10 of the jack type is interposed in the circuit between condensers 8 and 9. Said switch is adapted to co-operate with plug 11 to make the following contacts:

Tip 12 of said plug makes contact with contact member 13 of said jack. Sleeve 14 makes contact with member 15, and shell 16 makes contact with member 17 of said jack. When said plug is out of said jack, members 13 and 15 are connected by contacts 18; and when said plug is in place in said jack, said contacts are open. Thus, when plug 11 is inserted in jack 10 the effect is to open the oscillating circuit comprising condenser 7, 8 and 9 and coil 6 and to connect wires 19 and 20 thereto in such a way that any impedance between said wires will be interposed in said circuit. For convenience said wires may be provided with clips at their free ends, and together with plug 11, may be known as clip leads.

The operation of that portion of my invention thus far described herein is as follows: When the clip leads are plugged into jack 10 and said clip leads are short circuited, tube 1 will oscillate as a Meissner oscillator. If said clip leads are open, said tube will not oscillate. To preclude the possibility of undesired parasitic oscillations when said leads are open, I prefer to connect a resistor 21, which may be in the neighborhood of 2500 ohms resistance, across the aforesaid oscillating circuit. It will be apparent that there will be some value of resistance that may be connected across said clip leads above which said tube will not oscillate, and below which it will oscillate. If the ratio of inductance to capacity of the circuits associated with said vacuum tube is increased, the critical value of resistance above which said tube will not oscillate will be increased, and if said ratio be decreased, the value of said resistance will be decreased. Inasmuch as it is possible to vary the ratio of inductance to capacity of an oscillating circuit over a rather wide range, it is possible to vary said critical resistance value over a correspondingly wide range. I prefer to adjust said circuits so that said critical resistance will lie within the range of 25 to 100 ohms for use in testing radio receivers, although for some purposes it may be desirable to use values outside said range.

If the aforesaid clip leads are connected across a condenser 22 connected in parallel with a resistor 23, shown in Fig. 2, tube 1 will oscillate provided the resistance of said condenser 22 and said resistor 23 is below the aforesaid critical value. Said critical value may be, say, 50 ohms in which case said tube will oscillate if the resistance of resistor 23 is, say, 200 ohms and that of condenser 22 is below 67 ohms. On the other hand, if said condenser be open circuited, or if its resistance be more than 67 ohms, said tube will not oscillate. If the resistance of said condenser be only slightly below 67 ohms, said tube will oscillate but feebly, while if said resistance be very low, said tube will oscillate strongly. Thus, oscillation of tube 1 will indicate a good condenser 22, and non-oscillation of said tube will indicate a defective condenser, and said indication will be made without disconnecting resistor 23. The strength of said oscillations will be a measure of the resistance of said condenser provided said resistance is below a certain predetermined value.

However, in order that tube 1 shall oscillate when the resistance of condenser 22 is below 67 ohms in accordance with the foregoing explanation, it is necessary that the frequency of said oscillation be sufficiently high that the reactance of said condenser be low compared to the resistance of resistor 23. At high frequency, the oscillating current will, for the most part, pass thru condenser 22 and it will not then matter whether or not resistor 23 be present. On the other hand, at lower frequency said oscillating current would tend to pass thru resistor 23 as readily as thru condenser 22, and it would not then be possible to distinguish the two electrically. I find that a frequency of about 5,700 kilocycles serves very well to test condensers in ordinary radio receivers, and I prefer that the ratio of inductance to capacity be such that said oscillator will oscillate if the resistance of the condenser under test be below 30 ohms. Inasmuch as the shunt resistors ordinarily found connected to said condensers are at least 200 ohms in resistance, the effect of said resistors is negligible if the resistance of said condenser is below the oscillating point. Likewise, any inductances which may be connected in parallel with the condenser under test will also usually be of high enough reactance at this frequency to be neglected. If said frequency varies somewhat from said value of 5,700 kilocycles, the results will not be changed, and in case the resistance which might be connected in parallel with the condenser under test be higher compared to the capacity of said condenser, then said frequency may be made correspondingly lower. It will be apparent that the aforesaid frequency of oscillation, as well as the aforesaid ratio of inductance to capacity, may depend somewhat upon the nature of the impedance to which said clip leads are connected.

That the aforesaid frequency of 5,700 kilocycles, which I prefer, is not critical will be apparent when it is considered that the reactance of a 0.1 microfarad condenser is less than 0.3 ohms whereas the resistance connected in parallel therewith will seldom be less than 200 ohms, in which case said resistance will not interfere with the testing of said condenser. If the aforesaid frequency be halved, that is, reduced to 2,850 kilocycles, the reactance of said condenser will still be less than 0.6 ohm and it may still be tested notwithstanding the ordinary shunt resistor. However, if the frequency ordinarily used for routine testing of condensers to determine whether or not they are operating properly, which frequency usually is in the neighborhood of 1000 cycles per second, is used to test the aforesaid 0.1 microfarad condenser, its reactance will be about 1600 ohms and it cannot be tested with a 200 ohm shunt resistor in place. The requirement is that the test frequency be sufficiently high so that the reactance of the condenser is sufficiently low that its shunt impedance can be neglected. For some purposes it may be desirable to vary said frequency. This may be accomplished by replacing the coils or condensers that make up the oscillating circuit with others having different values, or an auxiliary condenser 9a may be provided which may be connected in parallel with condenser 9 by closing switch 9b, thus decreasing the frequency generated by the oscillator. The foregoing relations are those I have in mind when I refer in the claims to "a frequency sufficiently high that the reactance of said condenser is substantially lower than the impedance of its shunt circuit."

Having described the way in which my invention is adapted to test a condenser without disconnecting the same from other parts of the circuit by varying the strength of oscillation of a vacuum tube oscillator, or by stopping said oscillation, I will now describe the means that I prefer for indicating said oscillation. For this purpose, switch 24 may be considered to be in its open position. The following circuit is adapted to divert a portion of the oscillating current, thereby to indicate its presence and strength:

From the grid of tube 1 to the cathode of tube 25, to the grid of said tube 25 to jack 26, to the grid of tube 28, to the cathode of said tube 28, to the cathode of tube 1, thus completing the circuit. Since tube 25, which may if desired be of the "76" type, has only unidirectional conductivity between its grid and cathode, the voltage impressed on the grid of tube 28 will be unidirectional. I prefer tube 28 to be of the 6E5 type, although it may be any suitable cathode ray tube, and the amplitude of the unidirectional voltage impressed on its grid will then be indicated by the shape of the illuminated portion of its target. The shape of said illuminated portion will thus indicate whether or not tube 1 is oscillating, and the strength of oscillations present; and this indication will also be an indication of the resistance of the condenser under test.

Any other suitable means for indicating oscillation of a vacuum tube, such as for instance a vacuum tube voltmeter or a glow tube, might be used in place of the means just described. However, part of said means is useful in finding intermittent trouble in condensers, coils, resistors, and other parts of electrical apparatus. To illustrate this function, consider switch 24 to be closed after a condenser has been connected across the clip leads and plug 11 has been inserted in jack 10, so that tube 1 is oscillating with said condenser under test as part of the oscillating circuit.

As hereinbefore described, a voltage will be impressed from cathode to grid of tube 25, by the oscillation of tube 1, and said grid will thereby be made negative with respect to said cathode, acting as a rectifier. This negative grid will prevent plate current flowing in said tube 25, notwithstanding the positive voltage applied to said plate. Thus the application of plate voltage to tube 25 by closing switch 24 does not materially affect the operation of the rest of the circuit. If, however, the condenser under test fails even momentarily, thereby stopping the oscillation of tube 1 momentarily, the grid of tube 25 will become less negative and plate current will flow in tube 25 and this will prevent oscillation of tube 1, which will be indicated visually by tube 28, or otherwise. In this way, a momentary failure of the condenser under test will be indicated visually and said indication will persist until observed by an attendant. In order to start tube 1 oscillating, switch 24 should be opened; said switch may then be closed and said tube will continue oscillating, but it will not by itself start oscillating again once it has stopped.

While the above method of testing for intermittent failure has been described, for convenience, with reference to a condenser, it will be apparent that resistors, inductances, and other parts of electrical equipment may be similarly tested.

As mentioned, when the voltage applied to the grid of tube 25 decreases, as when tube 1 stops oscillating, plate current begins to flow in said tube 25 and this prevents oscillation of tube 1. Said prevention of oscillation of tube 1 is due principally to the abnormal voltages applied to said tube when plate current flows in tube 25. Said plate current necessarily flows thru grid leak 29 of tube 1, thereby making the grid of said tube positive with respect to its cathode. Said grid leak may have a resistance of about 250,000 ohms. At the same time, the plate current of both tubes 1 and 25 flowing thru resistor 30 reduces the plate voltage on said tubes, thereby preventing an undue increase in the plate current of tube 1 because of its positive grid bias. If desired, said limitation of plate current might be produced by increasing the resistance of the filter resistor 31, that is, by making the voltage regulation of the rectifier and filter inherently poor. If this were done, resistor 30 might be omitted. It is illustrated, however, because the apparatus embodying my invention might be used with any other suitable power supply, different from that shown in the dotted rectangle 32. If said apparatus should be used with a power supply having good voltage regulation, resistor 30 should be provided to protect tube 1 and to prevent intermittent oscillation of said tube.

I prefer to provide a rheostat 33 in the cathode circuit of tube 1 to be used for compensation of variations in the characteristics of different individual tubes that may be used. Also, I prefer to interpose resistor 34 in the alternating current plate circuit of tube 1. Then, when switch 24 is closed, said resistor will be shunted by condenser 35, which may be of sufficient capacity to effectively by-pass said resistor. Thus closing said switch tends to increase the strength of the oscillations from tube 1 by by-passing resistor 34. On the other hand, closing said switch tends to reduce said oscillations by slightly changing the voltage supply to tube 1 due to the supplying of voltage to the plate of tube 25. By proper choice of the value of resistance of resistor 34, said two opposing effects may be balanced and there will be substantially no change in the strength of oscillations of tube 1 when switch 24 is closed. Thus, closing switch 24 will not materially change the visual indication of said oscillations by tube 28, or other indicating means. Rheostat 33 may be of the order of 200 ohms resistance, and resistor 34 should be in the neighborhood of 2500 ohms. Condenser 35 may have a capacity of about 0.001 microfarads, although it may be more if desired.

Jack 26, similar to jack 10 but connected differently in the circuit, is adapted for use as a continuity indicator, that is, when plug 11 is inserted in said jack 26 the clip leads attached thereto may be connected to a coil, or other part to be tested, to determine whether or not there is a continuous path for direct current thru said coil. The need for testing continuity of electrical circuits is well known and there are various means for said testing in common use. However, the means herein described are adapted not only to indicate continuity, but also to register any interruptions thereof occurring during a given interval of time, thereby disclosing intermittent troubles. By this means, the continuity of resistor 23, shown in Fig. 2, may be tested without disconnecting condenser 22 therefrom, whereas, by the previously described method of testing for intermittent trouble, said resistor would not have been tested since, with the high frequency therein utilized, the reactance of condenser 22 would have been so low that the effect of resistor 23 would have been negligible. On the other hand, when plug 11 is inserted in jack 26, unidirectional current will flow thru the resistor under test, and said unidirectional current will not be affected by condenser 22. Coils, or other parts of electrical apparatus, may be similarly tested for intermittent failure with direct current without disconnecting them from their circuit.

When plug 11 is inserted in jack 26, the circuit between the grid of tube 25 and its grid leak 36 is opened and said grid will not then be sufficiently negative to prevent plate current flowing in said tube and, as hereinbefore described, tube 1 will be thereby prevented from oscillating. However, if the clip leads are connected to a coil, or other part, thru which there is a continuous circuit, the grid of tube 25 will remain negative and oscillation of tube 1 will continue, said oscillation being indicated as hereinbefore described. Thus, if clip leads are attached to a coil to be tested and plug 11 inserted in jack 26, and if switch 24 be thereafter closed, tube 1 will oscillate unless said coil be open. If, however, at any time while said coil and said apparatus are so connected said coil becomes open-circuited even momentarily, the fact of said failure will be registered by stopping of the oscillation of tube 1.

As hereinbefore described, the grid and cathode of tube 25 serve as rectifying means, and the rectified voltage is impressed on the grid of tube 28. To facilitate said rectification and thereby to increase the voltage so impressed on the grid of tube 28, I prefer to connect condenser 37 across grid leak 36. Said condenser 37 may be of the order of 0.1 microfarad, and said grid leak may be about 1 megohm in resistance. I prefer to ground the apparatus illustrated in Fig. 1 in the manner there shown, although this is not necessary. The rectifier and filter shown in the dotted rectangle 32 in Fig. 1 is not part of my invention. Any suitable power supply may be used, but if the values of resistance herein referred to by way of example are adhered to, the plate voltage supply should be in the neighborhood of 240 volts. The aforesaid rectifier and filter unit may be supplied with power by connecting wires 38 and 39 to a suitable power supply, not shown.

My invention is particularly directed to the testing of component parts of radio receivers without disconnecting said parts from the remainder of the circuit, and to locate intermittent trouble. However, said invention will be useful in testing any electrical apparatus where similar problems arise. In some cases, it may be desirable to test several component parts simultaneously for intermittent trouble. To this end, several test circuits may be combined in one unit, operated from a common power supply.

It will be found that some of the parts herein described as components of the preferred form of my invention may be used for other purposes not directly concerned with my invention. For example, if a 6E5 tube is used with my invention as an indicator of oscillation, said tube may also be used as a high resistance direct current voltmeter to indicate voltage in any part of a circuit, and a suitable jack may be provided to facilitate such use. Similarly, if an alternating voltage is to be measured, as in measuring the output of a radio receiver, said voltage may be rectified, as by tube 25, and then measured by said 6E5 tube. Thus, testing apparatus comprising my invention may also be used for other purposes.

As hereinbefore described, I prefer to impress sufficient voltage from the oscillation of tube 1 across the grid and cathode of tube 25 to maintain the latter grid sufficiently negative with respect to its cathode to prevent plate current flowing in tube 25. Then, when the plate of said tube 25 is connected to the plate of tube 1 by closing switch 24, said tube 1 will not be disturbed thereby. However, it is difficult in this way to prevent all plate current flowing in tube 25, and to minimize the disturbance of the voltages of tube 1 when switch 24 is closed, I find it advantageous to interpose resistor 34a in the plate circuit of tube 25. This resistor may be of the order of 250,000 ohms. It should be sufficiently high so that tube 1 will continue to oscillate when switch 24 is closed, but sufficiently low that tube 1 will not resume oscillation once it has stopped with switch 24 closed.

I claim:

1. Apparatus for testing the operative function of the component parts of an electrical device comprising an electrical test circuit including a plurality of branches and leads, an oscillator tube having a cathode, a grid, and a plate, an oscillating circuit therefor, an oscillation indicator adapted to indicate the strength of oscillations of said tube, a control tube having a cathode, a grid, and a plate, all of said devices being electrically connected in said test circuit, a branch circuit for applying voltage across the grid and cathode of the control tube to maintain said control tube grid negative with respect to its cathode to inhibit the flow of current between plate and cathode of said control tube, a branch lead supplying plate current to the plates of both of said tubes, a substantial resistance element arranged in said plate supplying lead, said parts being thus arranged to maintain said oscillator inoperative after the voltage applied to the control tube grid has been reduced to permit current to start flowing between plate and cathode in the control tube and means for interposing a part to be tested in said oscillating circuit.

2. Apparatus for testing the operative function of the component parts of an electrical device comprising an electrical test circuit including a plurality of branches and leads, an oscillator tube having a cathode, a grid, and a plate, an oscillating circuit therefor, an oscillation indicator adapted to indicate the strength of oscillations of said tube, a control tube having a cathode, a grid, and a plate, all of said devices being electrically connected in said test circuit, a branch circuit for applying voltage across the grid and cathode of the control tube to maintain said control tube grid negative with respect to its cathode to inhibit the flow of current between plate and cathode of said control tube, a branch lead supplying plate current to the plates of both of said tubes, a substantial resistance element arranged in said plate supplying lead, said parts being thus arranged to maintain said oscillator inoperative after the voltage applied to the control tube grid has been reduced to permit current to start flowing between plate and cathode in the control tube, means for interposing a part to be tested in said oscillating circuit, and means for interposing a part to be tested in said branch circuit.

3. Apparatus for testing the operative function of the component parts of an electrical device comprising an electrical test circuit including a plurality of branches and leads, an oscillator tube having a cathode, a grid, and a plate, an oscillating circuit therefor, an oscillation indicator adapted to indicate the strength of oscillations of said tube, a control tube having a cathode, a grid, and a plate, all of said devices being electrically connected in said test circuit, a branch circuit for applying voltage across the grid and cathode of the control tube to maintain said control tube grid negative with respect to its cathode to inhibit the flow of current between plate and cathode of said control tube, a branch lead connected to the cathode of said control circuit, a substantial resistance therein, a lead from said cathode branch lead electrically connected intermediate said control tube cathode and said latter resistance, and to the grid of the oscillator tube for applying voltage to the oscillator grid, thereby to maintain said oscillator inoperative after the voltage applied to the control tube grid has been reduced to permit current to start flowing between plate and cathode in the control tube, and means for interposing a part to be tested in said oscillating circuit.

4. Apparatus for testing the operative function of the component parts of an electrical device comprising an electrical test circuit including a plurality of branches and leads, an oscillator tube having a cathode, a grid, and a plate, an oscillating circuit therefor, an oscillation indicator adapted to indicate the strength of oscillations of said tube, a control tube having a cathode, a grid, and a plate, all of said devices being electrically connected in said test circuit, a branch circuit for applying voltage across the grid and cathode of the control tube to maintain said control tube grid negative with respect to its cathode to inhibit the flow of current between plate and cathode of said control tube, said parts being arranged to maintain said oscillator inoperative after the voltage applied to the control tube grid has been reduced to permit current to start flowing between plate and cathode in the control tube, means for interposing a condenser having other electrical apparatus connected in parallel therewith to be tested in said oscillating circuit, and condenser and coil elements electrically connected in said oscillating circuit to give capacity and inductance thereto to produce current in said oscillating circuit of such high frequency that the reactance to such frequency of the condenser being tested is substantially lower than the impedance of said apparatus in parallel therewith.

5. Apparatus for testing the operative function of the component parts of an electrical device comprising an electrical test circuit including a plurality of branches and leads, an oscillator tube having a cathode, a grid, and a plate, an oscillating circuit therefor, an oscillation indicator adapted to indicate the strength of oscillations of said tube, a control tube having a cathode, a grid, and a plate, all of said devices being electrically connected in said test circuit, a branch circuit for applying voltage across the grid and cathode of the control tube to maintain said control tube grid negative with respect to its cathode to inhibit the flow of current between plate and cathode of said control tube, a branch lead supplying plate current to the plates of both of said tubes, a substantial resistance element arranged in said plate supplying lead, a branch lead connected to the cathode of said control circuit, a substantial resistance therein, a lead from said cathode branch lead electrically connected intermediate said control tube cathode and said latter resistance, and to the grid of the oscillator tube for applying voltage to the oscillator grid, said parts being thus arranged to maintain said oscillator inoperative after the voltage applied to the control tube grid has been reduced to permit current to start flowing between plate and cathode in the control tube, and means for interposing a part to be tested in said oscillating circuit.

6. Apparatus for testing the operative function of the component parts of an electrical device comprising an electrical test circuit including a plurality of branches and leads, an oscillator tube having a cathode, a grid, and a plate, an oscillating circuit therefor, an oscillation indicator adapted to indicate the strength of oscillations of said tube, a control tube having a cathode, a grid, and a plate, all of said devices being electrically connected in said test circuit, a branch circuit for applying voltage across the grid and cathode of the control tube to maintain said control tube grid negative with respect to its cathode to inhibit the flow of current between plate and cathode of said control tube, a branch lead supplying plate current to the plates of both of said tubes, a make-and-break element in the plate supply to said control tube, a substantial resistance therein, a lead from said cathode branch lead electrically connected intermediate said control tube cathode and said latter resistance and to the grid of the oscillator tube for applying voltage to the oscillator grid, said parts being thus arranged to maintain said oscillator inoperative after the voltage applied to the control tube grid has been reduced to permit current to start flowing between plate and cathode in the control tube, means for interposing a condenser having other electrical apparatus connected in parallel therewith to be tested in said oscillating circuit, means for interposing a part to be tested in said branch circuit, and condenser and coil elements electrically connected in said oscillating circuit to give capacity and inductance thereto to produce current in said oscillating circuit of such high frequency that the reactance to such frequency of the condenser being tested is substantially lower than the impedance of said apparatus in parallel therewith 7. In testing apparatus for an electric circuit which includes an electric condenser and a resistance or inductive reactance in shunt relation to said condenser, a vacuum tube oscillator including an oscillating circuit, means for interposing said condenser in said oscillating circuit, and visual means adapted to be actuated by said oscillator for indicating oscillation thereof.

8. In testing apparatus for an electric circuit which includes an electric condenser and a resistance or inductive reactance in shunt relation to said condenser, a vacuum tube oscillator including an oscillating circuit, said oscillator being adapted to generate an electric current of a frequency sufficiently high that the reactance of said condenser thereto is substantially lower than the impedance of said shunt element, means for interposing said condenser in said oscillating circuit, and visual means adapted to be actuated by said oscillator for indicating oscillation thereof.

9. In testing apparatus for an electric circuit which includes an electric condenser and a resistance or inductive reactance in shunt relation to said condenser, a vacuum tube oscillator including an oscillating circuit, said oscillator being adapted to generate an electric current of a frequency sufficiently high that the reactance of said condenser thereto is substantially lower than the impedance of said shunt element, means for interposing said condenser in said oscillating circuit, said oscillator being adapted to oscillate when said condenser and shunt element interposed in said circuit offers an impedance to currents therein less than a certain predetermined value, said oscillator not being adapted to oscillate when said condenser and shunt element interposed in said circuit offers an impedance to currents therein less than a certain predetermined value, said oscillator not being adapted to oscillate when said condenser and shunt element interposed in said circuit offers an impedance greater than said predetermined value, and visual means adapted to be actuated by said oscillator for indicating oscillation thereof.

10. In testing apparatus for an electric circuit which includes an electric condenser and a resistance or inductive reactance in shunt relation to said condenser, a vacuum tube oscillator including an oscillating circuit, means for interposing said condenser in said oscillating circuit, and means adapted to be actuated by said oscillator for indicating the effective resistance of said condenser to the flow of current through said oscillating circuit.

11. In testing apparatus for an electric circuit which includes an electric condenser and a resistance or inductive reactance in shunt relation to said condenser, a vacuum tube oscillator including an oscillating circuit, said oscillator being adapted to generate an electric current of a frequency sufficiently high that the reactance of said condenser thereto is substantially lower than the impedance of said shunt element, means for interposing said condenser in said oscillating circuit, and means adapted to be actuated by said oscillator for indicating the effective resistance of said condenser to the flow of current through said oscillating circuit.

12. In testing apparatus for an electric circuit which includes an electric condenser and a resistance or inductive reactance in shunt relation to said condenser, a vacuum tube oscillator including an oscillating circuit, said oscillator being adapted to generate an electric current of a frequency sufficiently high that the reactance of said condenser thereto is substantially lower than the impedance of said shunt element, means for interposing said condenser in said oscillating circuit, said oscillator being adapted to oscillate when said condenser and shunt element interposed in said circuit offers an impedance to currents therein less than a certain predetermined value, said oscillator not being adapted to oscillate when said condenser and shunt element interposed in said circiut offers an impedance greater than said predetermined value, and means adapted to be actuated by said oscillator for indicating the effective resistance of said condenser to the flow of current through said oscillating circuit.

13. Apparatus for testing the operative function of a component part of an electrical device, said apparatus comprising an electrical test circuit, an oscillator tube and an oscillating circuit therefor, an oscillation indicator adapted to indicate oscillation of said tube, and a control tube, all of said devices being electrically connected in said test circuit, a branch circuit for applying voltage from said oscillator tube to said control tube to inhibit the flow of current through said control tube, a resistor connected in series with said control tube, said resistor being adapted and arranged so that when no voltage from said oscillator tube is applied to said control tube current flowing through said resistor will vary the voltage of said oscillator tube to prevent oscillations starting therein, manually operable means for starting oscillation of said oscillator tube by applying proper operating voltages thereto, and means for interposing said part of an electrical device to be tested in said oscillating circuit, thereby permitting said oscillating tube to function as long as said part is properly and continuously electrically conductive but preventing said oscillating tube automatically restarting to function after having been stopped by a temporary failure of said part.

PAUL R. DUNLAP.